(12) United States Patent
Lu et al.

(10) Patent No.: US 9,360,713 B2
(45) Date of Patent: Jun. 7, 2016

(54) METHOD FOR MANUFACTURING COLOR FILTER, COLOR FILTER, AND DISPLAY DEVICE

(71) Applicant: BOE TECHNOLOGY GROUP CO., LTD., Beijing (CN)

(72) Inventors: Jinbo Lu, Beijing (CN); Zhuo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/126,964

(22) PCT Filed: Nov. 12, 2012

(86) PCT No.: PCT/CN2012/084482
§ 371 (c)(1),
(2) Date: Dec. 17, 2013

(87) PCT Pub. No.: WO2013/149469
PCT Pub. Date: Oct. 10, 2013

(65) Prior Publication Data
US 2014/0118670 A1    May 1, 2014

(30) Foreign Application Priority Data
Apr. 1, 2012    (CN) .......................... 2012 1 0096977

(51) Int. Cl.
*G02F 1/1339*    (2006.01)
*G02F 1/1335*    (2006.01)
(Continued)

(52) U.S. Cl.
CPC ...... *G02F 1/13394* (2013.01); *G02F 1/133512* (2013.01); *G02F 1/133514* (2013.01); *G02B 5/201* (2013.01); *G02B 5/22* (2013.01); *G02F 1/133516* (2013.01); *G02F 2203/01* (2013.01)

(58) Field of Classification Search
CPC .................... G02F 1/133514; G02F 1/133512; G02F 1/13394
USPC .................. 349/106–109, 110, 155–156, 187
See application file for complete search history.

(56) References Cited

U.S. PATENT DOCUMENTS 7,053,974 B2 * 5/2006 Hwang ........................ 349/106
7,286,199 B2 * 10/2007 Moriya ........................ 349/106
(Continued)

FOREIGN PATENT DOCUMENTS

CN        1704808 A    12/2005
CN        1992300 A    7/2007
(Continued)

OTHER PUBLICATIONS

Written Opinion of the International Searching Authority; dated Feb. 28, 2013; PCT/CN2012/084482.
(Continued)

*Primary Examiner* — Dung Nguyen
(74) *Attorney, Agent, or Firm* — Ladas & Parry LLP

(57) ABSTRACT

A method for manufacturing a color filter, the color filter, and a display device. The method for manufacturing the color filter includes: forming multiple transparent columnar objects in a pixel area of a substrate; forming on the substrate having formed thereon the transparent columnar object a black array that encircles to form the pixel area; and forming pixel resin layers in the pixel area, where the transparent columnar objects protrude outwards from the pixel resin layers to serve as columnar spacers. This allows for accurate control of the aperture size and aperture area of pores in the pixel area of the color filter.

8 Claims, 5 Drawing Sheets

(51) Int. Cl.
*G02B 5/20* (2006.01)
*G02B 5/22* (2006.01)

(56) References Cited

U.S. PATENT DOCUMENTS

| | | | |
|---|---|---|---|
| 8,836,906 B2* | 9/2014 | Kurokawa et al. | 349/155 |
| 2004/0109126 A1* | 6/2004 | Washizawa et al. | 349/155 |
| 2005/0253994 A1* | 11/2005 | Kamijima et al. | 349/106 |
| 2007/0211196 A1 | 9/2007 | Kang et al. | |

FOREIGN PATENT DOCUMENTS

| | | |
|---|---|---|
| CN | 102103224 A | 6/2011 |
| CN | 102707360 A | 10/2012 |
| JP | 09-033713 A | 2/1997 |
| JP | 10-307288 A | 11/1998 |
| JP | 2000/056122 A | 2/2000 |

OTHER PUBLICATIONS

First Chinese Office Action dated Sep. 22, 2013; Appln. No. 201210096977.9.

International Preliminary Report on Patentability Appln. No. PCT/CN2012/084482; Dated Oct. 1, 2014.

Extended European Search Report Appln. No. 12873683.2-1904/2835669 PCT/CM2012084482; Dated Oct. 8, 2015.

* cited by examiner

METHOD FOR MANUFACTURING COLOR FILTER, COLOR FILTER, AND DISPLAY DEVICE

TECHNICAL FIELD

The present disclosure relates to liquid display, particularly, to a method of manufacturing a color filter, a color filter and a display device.

BACKGROUND

Forming apertures in the pixel region of the color filters is often adopted in the conventional technique to realize greater transmissivity and brightness of the color filters, and in particular, it is widely used in the production of transflective color filters. In order to obtain color images with high quality in both bright and dark environments, consideration shall be given to both the reflection performance and transmission performance of the transflective color filters, and both performances require possibly high brightness and color saturation of the color filters. Therefore, to balance the brightness and the color saturation, the conventional techniques usually adopt the way of forming apertures in the reflection region.

Conventionally, process of forming apertures is realized by using a mask etched with aperture patterns, and forming apertures in the pixel resin layer (color resin layer) of the reflection region by exposure and development processes. It is not easy to control the size of the apertures, which greatly increases the difficulty of manufacturing; on the other hand, difficulty in controlling the size of the apertures can result in the uncertainty of the aperture area, and may result in the deviation of the resulted color from the design value.

SUMMARY

The present disclosure provides a method of manufacturing a color filter, a color filter and a display device, so as to accurately control the aperture size and the aperture area in the pixel region of the color filter.

According to an aspect, the embodiments of the present disclosure provide a method of manufacturing a color filter, the method comprising: forming a plurality of transparent columns in pixel regions of a substrate; forming a black matrix on the substrate having the transparent columns, wherein the black matrix defines the pixel regions; and forming pixel resin layers in the pixel regions, wherein the transparent columns project from the pixel resin layers and serve as post spacers.

According to an example, the manufacturing method further comprises forming a transparent conductive layer on the black matrix and pixel resin layers.

According to an example, the manufacturing method further comprises forming a transparent protective layer between the black matrix and pixel resin layers, and the transparent conductive layer.

According to an example, forming of the plurality of transparent columns in pixel regions of a substrate comprises: forming an aperture mask in the pixel regions of the substrate; coating transparent resin on the substrate having the aperture mask; removing the transparent resin outside the pixel regions; curing the transparent resin; and removing the aperture mask.

According to an example, forming of the aperture mask in the pixel regions of the substrate comprises: applying a metal foil to the substrate; removing the metal foil outside the pixel regions; forming the porous metal oxide mask by a two-step anodization process.

According to an example, the metal foil is an aluminum foil.

According to another aspect, the embodiments of the present disclosure provide a color filter, comprising: a substrate; a plurality of transparent columns formed in pixel regions of the substrate; a black matrix formed on the substrate, wherein the black matrix defines the pixel regions; and pixel resin layers formed in the pixel regions, wherein the transparent columns project from the pixel resin layers and serve as post spacers.

According to an example, each of the transparent columns has a height of 6-15 μm.

A liquid crystal display panel comprises the above said color filters.

A display device comprises the above said liquid crystal display panel.

Compared with the conventional techniques, the present disclosure forms uniformly distributed transparent columns in the pixel regions of the substrate by using aperture/porous mask of aluminum oxide, the formation of the transparent columns is alike to forming apertures in the pixel resin layers. In addition, by adjusting the size and density of apertures of the aperture mask, accurate control of the size and area of the apertures in the pixel regions is realized. At the same time, the transparent columns act as the post spacers, and since they are uniformly distributed in the pixel regions, the stability of the cell gap is improved and bad display caused by uneven cell gap is avoided.

BRIEF DESCRIPTION OF THE DRAWINGS

In order to clearly illustrate the technical solution of the embodiments of the present invention or the conventional techniques, the accompanying drawings will be briefly described below. It is apparent that the described drawings are for illustrating some embodiments of the invention. Those ordinary skilled in the art can obtain other drawings according to these drawings without creative labor.

DETAILED DESCRIPTION

The technical solutions of the embodiments will be described herein clearly and completely in connection with the drawings related to the embodiments of the invention. Apparently, the described embodiments are just a part but not all of the embodiments of the invention. Based on the described embodiments, other embodiments contemplated by an ordinary person in the art without inventive work, shall be within the scope of the present invention.

The embodiments of the present disclosure provide a method of manufacturing a color filter, which forms uniformly distributed transparent columns in the pixel regions of the substrate by using aperture/porous mask of aluminum oxide, and the formation of the transparent columns is alike forming apertures in the pixel resin layers. In addition, by adjusting the size and density of apertures of the aperture mask, accurate control of the size and area of the apertures in the pixel regions is realized. At the same time, the transparent columns act as the post spacers, and since they are uniformly distributed in the pixel regions, the stability of the cell gap is improved and bad display caused by uneven cell gap is avoided.

Figure 5:
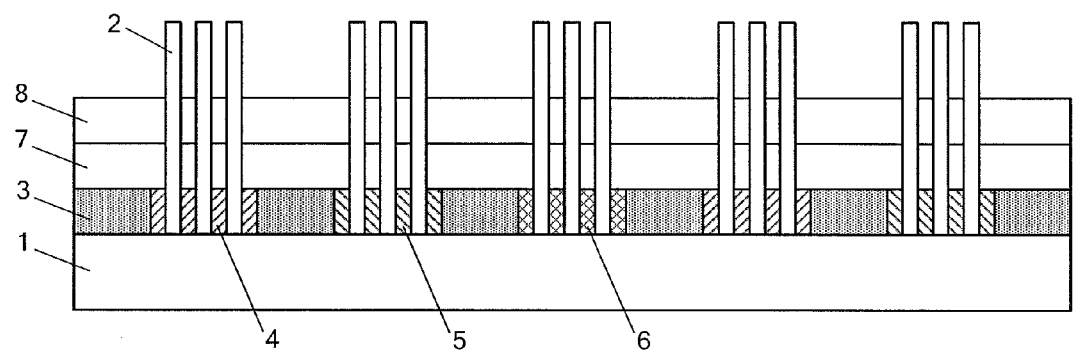
FIG. 5 is a sectional view of the color filter in the embodiments of the present disclosure.

Referring to FIG. 5, the color filter of the embodiments of the present disclosure may comprise: a substrate 1; a plurality of transparent columns 2 formed in the pixel regions of the substrate 1; a black matrix 3 formed on the substrate 1, the black matrix 3 defining the pixel regions; pixel resin layers (comprising a red pixel resin layer 4, a green pixel resin layer 5 and a blue pixel resin layer 6) formed in the pixel regions, the transparent columns 2 projecting from the pixel resin layers and serving as post spacers.

Optionally, the color filter may further comprise: a transparent conductive layer 8 formed over the black matrix 3 and the pixel resin layers; or a transparent protective layer 7 formed on the black matrix 3 and the pixel resin layers, and a transparent conductive layer 8 formed on the transparent protective layer 7.

Wherein, each of the transparent columns may have a height of 6-15 μm, the black matrix may have a thickness of 1-5 μm, the pixel resin layers may have a thickness of 1-5 μm, and the transparent protective layer may have a thickness of 1-5 μm. The transparent columns and the transparent protective layer may be made of same material. The transparent columns can be made of other transparent resin materials.

Figure 1:
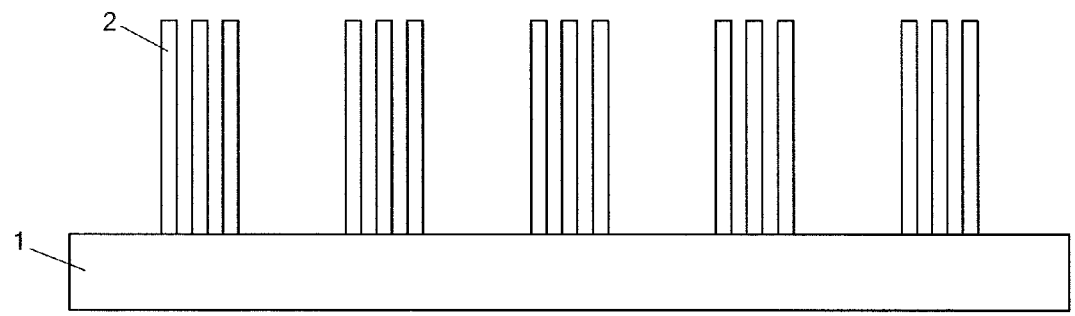
FIG. 1 is a sectional view of the color filter wherein the transparent columns are formed in the embodiments of the present disclosure.
Figure 7:
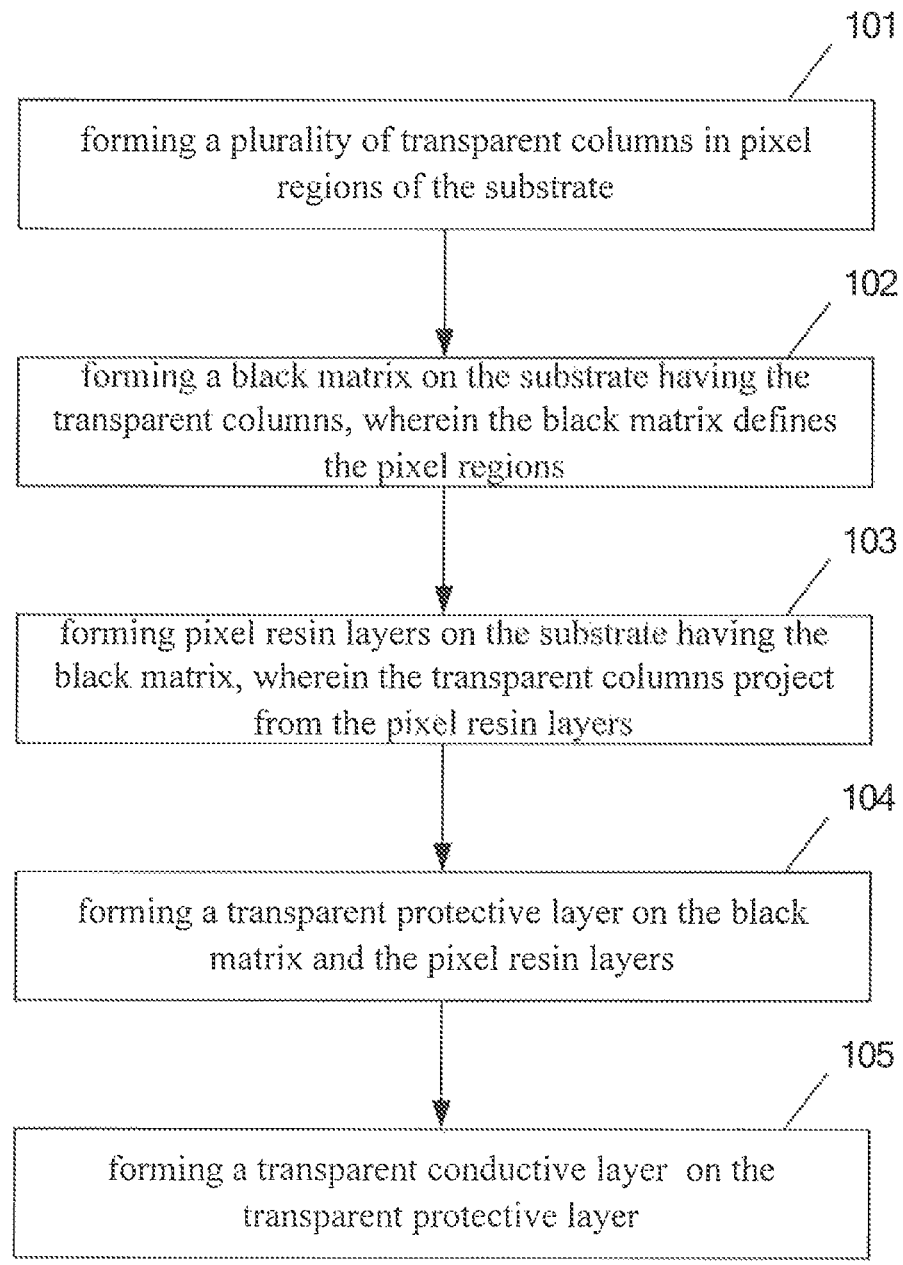
FIG. 7 is a flow chart of the method of manufacturing the color filter in the embodiments of the present disclosure.
Figure 8:
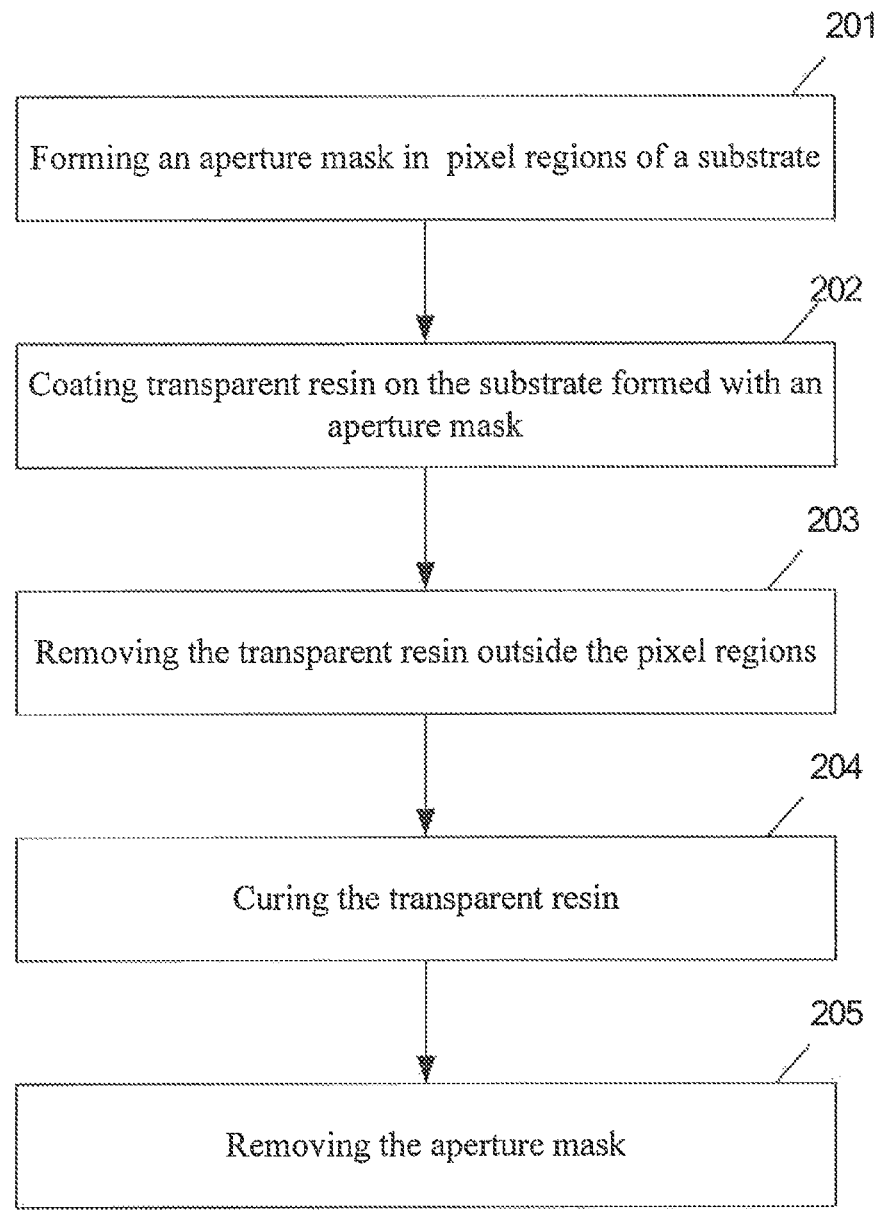
FIG. 8 is a flow chart of the method of forming a plurality of transparent columns.

Referring to FIG. 7, the method of manufacturing the color filter in the embodiments of the present disclosure may comprise:

Step 101: forming a plurality of transparent columns 2 in pixel regions of the substrate 1;

As shown in FIG. 8, the method of forming a plurality of transparent columns 2 comprises: Step 201: forming an aperture mask in the pixel regions of the substrate; Step 202: coating transparent resin on the substrate having the aperture mask; Step 203: removing the transparent resin outside the pixel regions by photolithography; and Step 204: curing the transparent resin before Step 205: removing the aperture mask, so that the transparent columns 2 are formed (as shown in FIG. 1).

Figure 6:
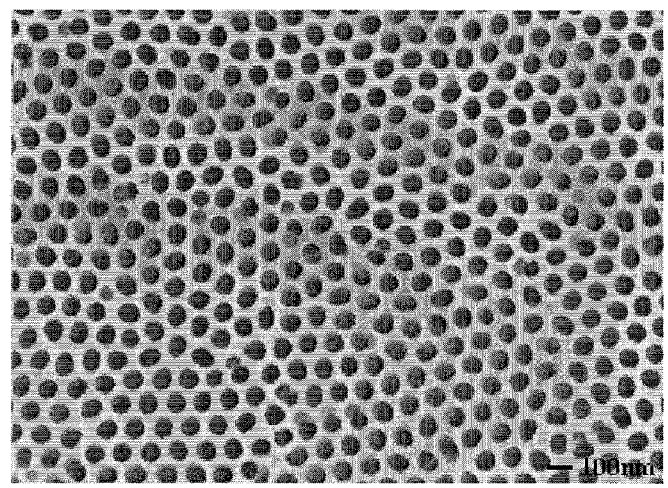
FIG. 6 is an SEM photograph of the porous aluminum oxide mask in the embodiments of the present disclosure.
Figure 9:
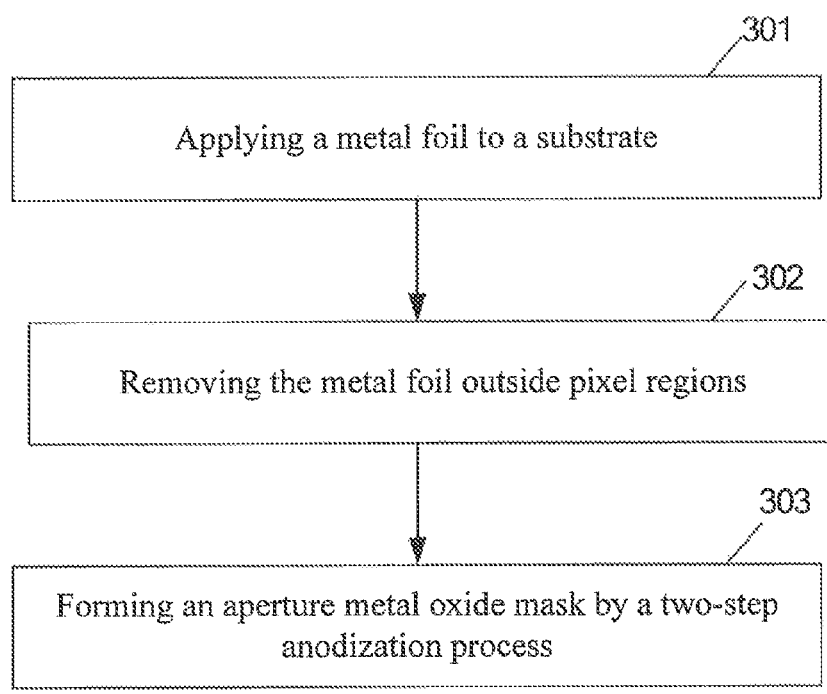
FIG. 9 is a flow chart of the method of forming the aperture mask in the pixel regions of the substrate.

As shown in FIG. 9, the method of forming the aperture mask in the pixel regions of the substrate comprises: Step 301: applying an aluminum foil to the substrate; Step 302: removing the metal foil outside the pixel regions by etching; Step 303: forming porous aluminum oxide mask by a two-step anodization process. FIG. 6 is a top view of the formed porous aluminum oxide mask. The aperture mask may be formed by applying other types of metal foils.

Each of the formed transparent columns 2 may have a height of 6-15 μm.

In addition, the density of the transparent columns 2 may be adjusted according to the desired aperture area in the pixel regions. And the transparent columns 2 may be formed throughout the pixel regions, or in a part of the pixel regions.

Step 102: forming a black matrix 3 on the substrate 1 having the transparent columns 2, wherein the black matrix defines the pixel regions.

Figure 2:
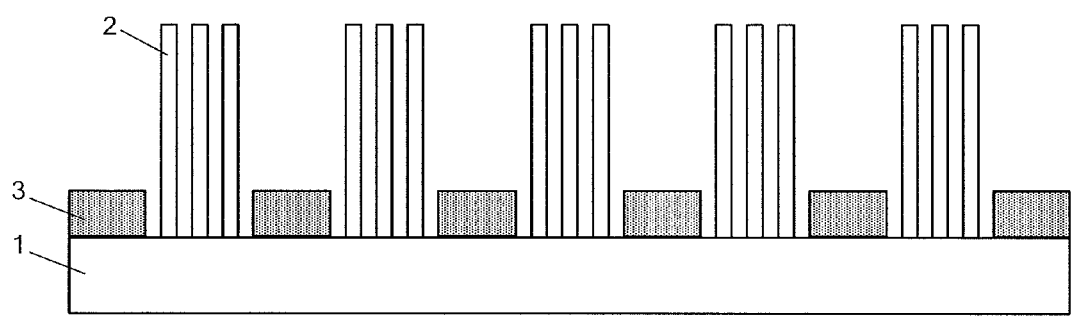
FIG. 2 is a sectional view of the color filter wherein the black matrix pattern is formed in the embodiments of the present disclosure.

The black matrix 3 may be formed by photolithography or by ink jet method, and preferably by the ink jet method. The black matrix 3 may have a thickness of 1-5 μm. The pattern of the formed black matrix 3 is shown in FIG. 2.

Step 103: forming pixel resin layers on the substrate having the black matrix 3, the transparent columns 2 projecting from the pixel resin layers. The transparent columns 2 may serve as post spacers.

Figure 3:
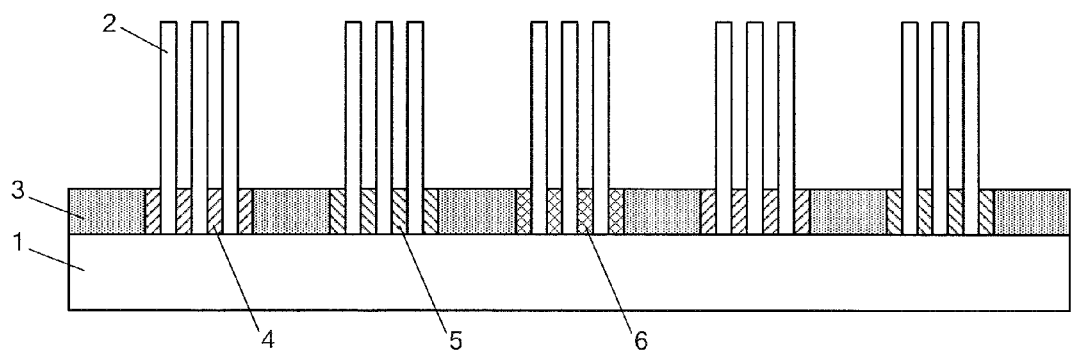
FIG. 3 is a sectional view of the color filter wherein the pixel resin layers are formed in the embodiments of the present disclosure.

The pixel resin layer(s) may be formed by photolithography or by an ink jet method, and preferably by the ink jet method. In this step, a red pixel resin layer, a green pixel resin layer and a blue pixel resin layer may be individually formed in three separate times. The pixel resin layers may have a thickness of 1-5 μm. The pattern of the formed pixel resin layers is shown in FIG. 3.

Step 104: forming a transparent protective layer 7 on the black matrix and the pixel resin layers.

Figure 4:
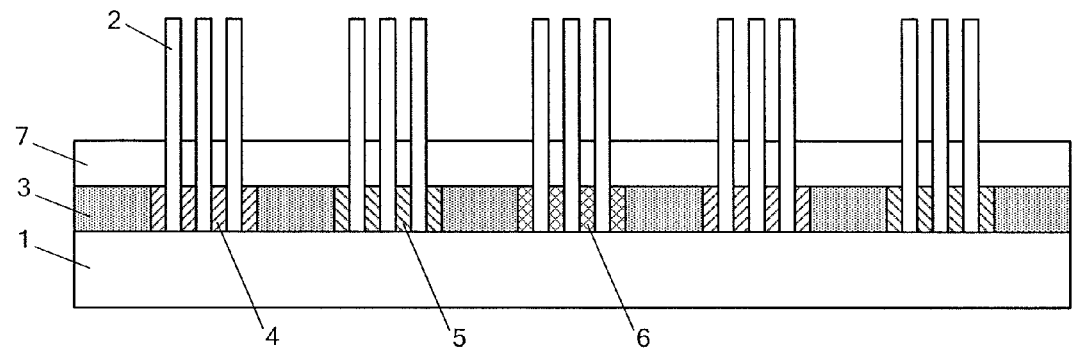
FIG. 4 is a sectional view of the color filter wherein the transparent protective layer is formed in the embodiments of the present disclosure.

The transparent protective layer 7 (as shown in FIG. 4) may be formed by coating, spraying or baking process, and preferably by the spraying process. The transparent protective layer 7 may have a thickness of 1-5 μm.

Step 105: forming a transparent conductive layer 8 on the transparent protective layer 7. The transparent columns 2 project from the transparent conductive layer 8 and may serve as post spacers.

The transparent conductive layer (as shown in FIG. 5) may be formed by depositing or electroplating process. The transparent conductive layer 8 may have a thickness of 500-2000 Å.

Furthermore, the foregoing steps 104 and 105 may be selectively performed according to the practical situations. For example, when the color filter does not comprise the transparent protective layer, the step 104 may be omitted; when the color filter does not comprise the transparent conductive layer, the step 105 may be omitted.

The embodiments of the present disclosure further provide a liquid crystal display panel, which comprises an array substrate, a color filter mentioned above, and a liquid crystal layer filled between the array substrate and the color filter.

The embodiments of the present disclosure further provide a display device, which comprises the above mentioned liquid crystal display panel.

In general, the embodiments of the present disclosure provide a method of manufacturing a color filter, which forms uniformly distributed transparent columns in the pixel regions of the substrate by using aperture/porous mask of aluminum oxide, the formation of the transparent columns is alike to forming aperture in the pixel resin layers. In addition, by adjusting the size and density of apertures of the aperture mask, accurate control of the size and area of the apertures in the pixel regions is realized. At the same time, the transparent columns act as the post spacers, and since they are uniformly distributed in the pixel regions, the stability of the cell gap is improved and bad display caused by uneven cell gap is avoided.

The above embodiments are used for illustrating the technical solutions of the present invention only and not intended to limit the scope of the disclosure. It will be understood by an ordinary person in the art that many changes and variations may be made therein without departing from the spirit and scope of the present invention. And thus these changes, variations and equivalent thereof belong to the scope of the present invention, as defined by the appended claims.

What is claimed is that:

1. A color filter, comprising:
a substrate;
a plurality of transparent columns formed within in pixel regions of the substrate;
a black matrix formed on the substrate, wherein the black matrix defines the pixel regions; and
pixel resin layers formed in the pixel regions, wherein the transparent columns project from the pixel resin layers and serve as post spacers, and end surfaces of the transparent columns and the pixel resin layers are in a same surface of the substrate.

2. The color filter according to claim 1, further comprising:
a transparent conductive layer formed on the black matrix and the pixel resin layers.

3. The color filter according to claim 2, further comprising:
a transparent protective layer formed between the black matrix and pixel resin layers, and the transparent conductive layer.

4. The color filter according to claim 3, wherein each of the transparent columns has a height of 6-15 µm.

5. The color filter according to claim 2, wherein each of the transparent columns has a height of 6-15 µm.

6. The color filter according to claim 1, wherein each of the transparent columns has a height of 6-15 µm.

7. A liquid crystal display panel, comprising: a color filter according to claim 1.

8. A display device, comprising: a liquid crystal display panel according to claim 7.

* * * * *